US007225429B2

(12) United States Patent
Bates et al.

(10) Patent No.: US 7,225,429 B2
(45) Date of Patent: May 29, 2007

(54) BREAKPOINT GROUPS BASED ON CONTROL FLOW

(75) Inventors: Cary Lee Bates, Rochester, MN (US); Paul W. Buenger, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 704 days.

(21) Appl. No.: 10/459,759

(22) Filed: Jun. 12, 2003

(65) Prior Publication Data

US 2004/0255278 A1    Dec. 16, 2004

(51) Int. Cl.
    G06F 9/44        (2006.01)
(52) U.S. Cl. .................. 717/125; 717/129; 717/130; 717/132
(58) Field of Classification Search ............... None
    See application file for complete search history.

(56) References Cited

U.S. PATENT DOCUMENTS 6,295,613 B1    9/2001  Bates et al.
6,378,125 B1    4/2002  Bates et al.
6,728,954 B1*   4/2004  Kesselman et al. ......... 717/154
7,065,634 B2*   6/2006  Lewis et al. ................ 712/227
2002/0191023 A1* 12/2002 Chandhoke et al. ........ 345/771
2003/0079206 A1* 4/2003  Bates et al. ................. 717/129

OTHER PUBLICATIONS

Sosic, Rok, A procedural Interface for Program Directing, Software-Practice and Experience, vol. 25(7), Jul. 1995, [retrieved on Jan. 20, 2002]. Retrieved from the Internet: <URL: http:www.cs.ubc.ca/local/reading/proceedings/spe91-95/spe/vol25/issue7/spe963rs.pdf. 21 pages.*

* cited by examiner

*Primary Examiner*—Tuan Dam
*Assistant Examiner*—Andrew Y. Chou
(74) *Attorney, Agent, or Firm*—Owen J. Gamon

(57) ABSTRACT

A method, apparatus, system, and signal-bearing medium that in an embodiment, determine the control flow relationship between breakpoints and graphically display this relationship. Breakpoints are added to a breakpoint group based on their position within the control flow of a program. In an embodiment, when a control flow construct is selected in the graphical display, the breakpoints associated with the control flow construct are added to a breakpoint group.

16 Claims, 11 Drawing Sheets

BREAKPOINT GROUPS BASED ON CONTROL FLOW

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

This invention generally relates to computer programming and more specifically relates to grouping breakpoints based on control flow in a computer program.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated and complex computer software has evolved to take advantage of the higher performance of the hardware, resulting in computer systems today that are much more powerful than just a few years ago.

As the sophistication and complexity of computer software increase, the more difficult the software is to debug. Bugs are problems, faults, or errors in a computer program. Locating, analyzing, and correcting suspected faults in a computer program is a process known as "debugging." Typically, a programmer uses another computer program commonly known as a "debugger" to debug a program under development.

Conventional debuggers typically support two primary operations to assist a computer programmer. A first operation supported by conventional debuggers is a "step" function, which permits a computer programmer to process instructions (also known as "statements") in a computer program one-by-one and see the results upon completion of each instruction. While the step operation provides a programmer with a large amount of information about a program during its execution, stepping through hundreds or thousands of program instructions can be extremely tedious and time consuming, and may require a programmer to step through many program instructions that are known to be error-free before a set of instructions to be analyzed are executed.

To address this difficulty, a second operation supported by conventional debuggers is a breakpoint operation, which permits a computer programmer to identify with a breakpoint a precise instruction for which it is desired to halt execution of a computer program during execution. As a result, when a computer program is executed by a debugger, the program executes in a normal fashion until a breakpoint is reached. The debugger then stops execution of the program and displays the results of the program to the programmer for analysis.

Typically, step operations and breakpoints are used together to simplify the debugging process. Specifically, a common debugging operation is to set a breakpoint at the beginning of a desired set of instructions to be analyzed and then begin executing the program. Once the breakpoint is reached, the debugger halts the program, and the programmer then steps through the desired set of instructions line-by-line using the step operation. Consequently, a programmer is able to more quickly isolate and analyze a particular set of instructions without having to step through irrelevant portions of a computer program.

Thus, once the programmer determines the appropriate places in the program and sets breakpoints at those appropriate places, the breakpoints can be a powerful tool. But, many breakpoints may be needed, and the breakpoints needed may change over time as the programmer gains more information about the problem being debugged. Hence, determining the appropriate places in the program, setting breakpoints at those places, and removing the breakpoints that are no longer needed can be an arduous task.

To make setting and removing breakpoints easier, some conventional debuggers have breakpoint groups. The primary use of these groups is to form a collection of breakpoints, which can be enabled and disabled all at once. Breakpoint groups allow the programmer to more rapidly adjust the debug environment and not be burdened by excessive and undesired breakpoint hits.

Unfortunately, the user still must decide what breakpoints to set and how to organize them into groups. Further, the breakpoints that the user wants set often change dramatically as the debug process progresses and the user learns more about the problem. Thus, managing breakpoints is still a burdensome problem for users.

Without a better way to manage breakpoints, the debugging of programs will continue to be a difficult and time-consuming task, which delays the introduction of software products and increases their costs.

SUMMARY

A method, apparatus, system, and signal-bearing medium are provided that in an embodiment determine the control flow relationship between breakpoints and graphically display this relationship. Breakpoints are added to a breakpoint group based on their position within the control flow of a program. In an embodiment, when a control flow construct is selected in the graphical display, the breakpoints associated with the control flow construct are added to a breakpoint group.

DETAILED DESCRIPTION

Figure 1:
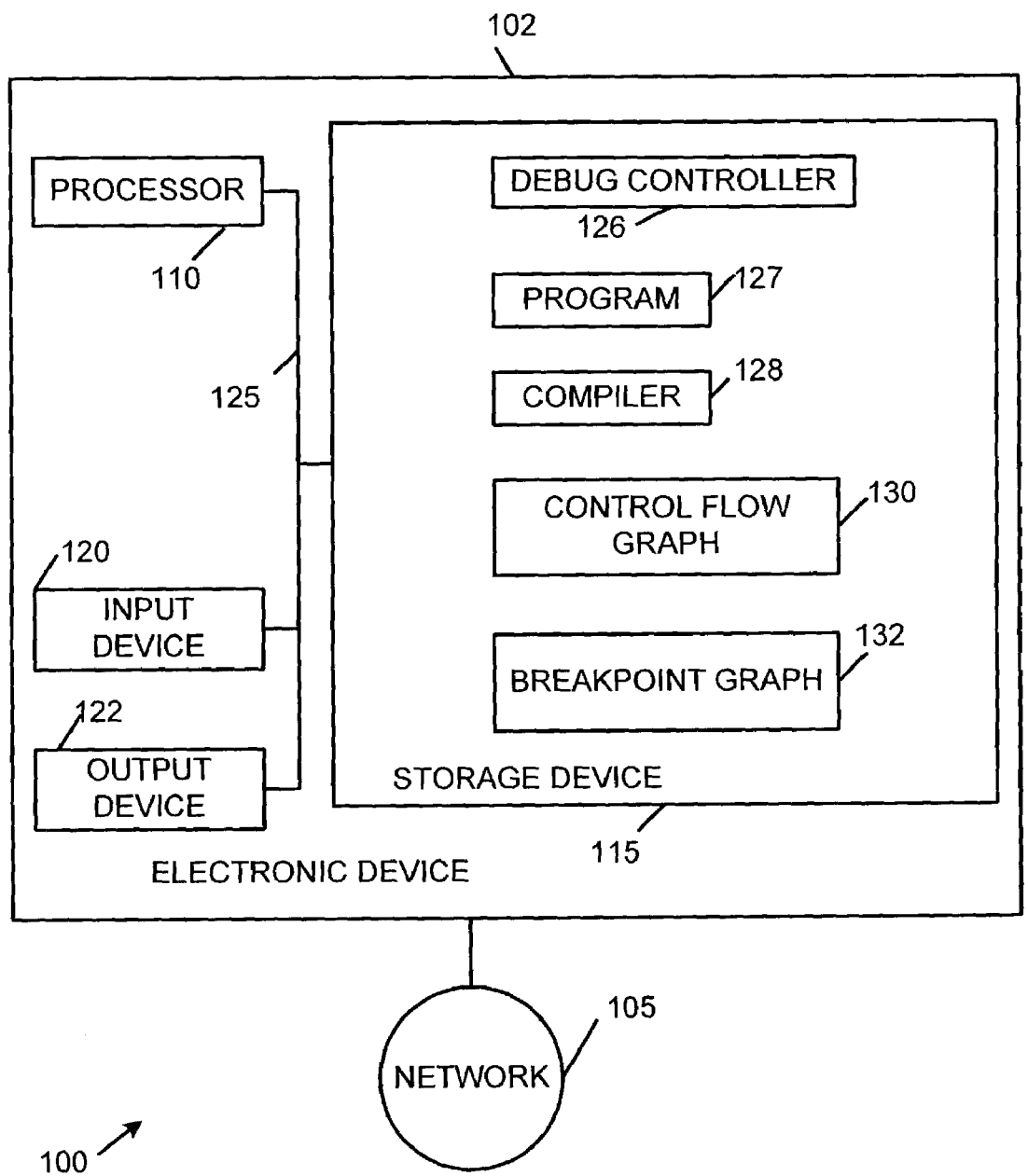
FIG. 1 depicts a block diagram of an example system for implementing an embodiment of the invention.

FIG. 1 depicts a block diagram of an example system 100 for implementing an embodiment of the invention. The system 100 includes an electronic device 102 connected to a network 105. Although only one electronic device 102 and one network 105 are shown, in other embodiments any number or combination of them may be present. In another embodiment, the network 105 is not present.

The electronic device 102 includes a processor 110, a storage device 115, an input device 120, and an output device 122, all connected directly or indirectly via a bus 125. The processor 110 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 110 executes instructions and includes that portion of the electronic device 102 that controls the operation of the entire electronic device. Although not depicted in FIG. 1, the processor 110 typically includes a control unit that organizes data and program storage in memory and transfers data and other information between the various parts of the electronic device 102. The processor 110 reads and/or writes code and data to/from the storage device 115, the network 105, the input device 120, and/or the output device 122.

Although the electronic device 102 is shown to contain only a single processor 110 and a single bus 125, embodiments of the present invention apply equally to electronic devices that may have multiple processors and multiple buses with some or all performing different functions in different ways.

The storage device 115 represents one or more mechanisms for storing data. For example, the storage device 115 may include read only memory (ROM), random access memory (RAM), magnetic disk storage media, optical storage media, flash memory devices, and/or other machine-readable media. In other embodiments, any appropriate type of storage device may be used. Although only one storage device 115 is shown, multiple storage devices and multiple types of storage devices may be present. Further, although the electronic device 102 is drawn to contain the storage device 115, it may be distributed across other electronic devices, such as devices connected to the network 105.

The storage device 115 includes a debug controller 126, a program 127, a compiler 128, a control flow graph data structure 130, and a breakpoint graph data structure 132, all of which may in various embodiments have any number of instances. The debug controller 126 creates the breakpoint graph 132 in order to debug the program 127. In an embodiment, the debug controller 126 includes instructions capable of executing on the processor 110 or statements capable of being interpreted by instructions executing on the processor 110 to display the user interfaces as further described below with reference to FIG. 2 and to carry out the functions as further described below with reference to FIGS. 4–11 using the control flow graph 130 as further described below with reference to FIG. 3B. In another embodiment, the debug controller 126 may be implemented in hardware via logic gates and/or other appropriate hardware techniques.

The program 127 includes instructions capable of executing on the processor 110 or statements capable of being interpreted by instructions executing on the processor 110. The program 127 is to be debugged using the debug controller 126.

The compiler 128 compiles the program 127 and generates the control flow graph 130. In another embodiment, the compiler 128 may be an interpreter. The control flow graph 130 is further described below with reference to FIG. 3B.

The breakpoint graph 132 is generated by the debug controller 126 and contains information about the control flow relationships between the breakpoints in the program 127. In various embodiments, the control flow relationships may be actual relationships between the breakpoints measured as the program 127 executes, all potential relationships between the breakpoints, or only some potential relationships between the breakpoints. The breakpoint graph 132 is further described below with reference to FIG. 3A.

Although the debug controller 126, the program 127, the compiler 128, the control flow graph 130, and the breakpoint graph 132 are all illustrated as being contained within the storage device 115 in the electronic device 102, in other embodiments some or all of them may be on different electronic devices and may be accessed remotely, e.g., via the network 105.

The input device 120 may be a keyboard, mouse or other pointing device, trackball, touchpad, touchscreen, keypad, microphone, voice recognition device, or any other appropriate mechanism for the user to input data to the electronic device 102 and/or to manipulate the user interfaces of the electronic device 102. Although only one input device 120 is shown, in another embodiment any number and type of input devices may be present. The input device 120 may be used to interact with and manipulate the user interfaces of FIG. 2, as further described below.

The output device 122 is that part of the electronic device 102 that presents output to the user. The output device 122 may be a cathode-ray tube (CRT) based video display well known in the art of computer hardware. But, in other embodiments the output device 122 may be replaced with a liquid crystal display (LCD) based or gas, plasma-based, flat-panel display. In still other embodiments, any appropriate display device may be used. In other embodiments, a speaker or a printer may be used. In other embodiments any appropriate output device may be used. Although only one output device 122 is shown, in other embodiments, any number of output devices of different types or of the same type may be present. The output device 122 may display or otherwise present the user interface of FIG. 2.

The bus 125 may represent one or more busses, e.g., PCI (Peripheral Component Interconnect), ISA (Industry Standard Architecture), X-Bus, EISA (Extended Industry Standard Architecture), or any other appropriate bus and/or bridge (also called a bus controller).

The electronic device 102 may be implemented using any suitable hardware and/or software, such as a personal computer. Portable computers, laptop or notebook computers, PDAs (Personal Digital Assistants), pocket computers, telephones, pagers, automobiles, teleconferencing systems, appliances, and mainframe computers are examples of other possible configurations of the electronic device 102. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The network 105 may be any suitable network or combination of networks and may support any appropriate protocol suitable for communication of data and/or code to/from the electronic device 102. In various embodiments, the network 105 may represent a storage device or a combination of storage devices, either connected directly or indirectly to the electronic device 102. In an embodiment, the network 105 may support Infiniband. In another embodiment, the network 105 may support wireless communications. In another embodiment, the network 105 may support hard-wired communications, such as a telephone line or cable. In another embodiment, the network 105 may support the Ethernet IEEE (Institute of Electrical and Electronics Engineers) 802.3x specification. In another embodiment, the network 105 may be the Internet and may support IP (Internet Protocol). In another embodiment, the network 105 may be a local area network (LAN) or a wide area network (WAN). In another embodiment, the network 105 may be a hotspot service provider network. In another embodiment, the network 105 may be an intranet. In another embodiment, the network 105 may be a GPRS (General Packet Radio Service) network. In another embodiment, the network 105 may be any appropriate cellular data network or cell-based radio network technology. In another embodiment, the network 105 may be an IEEE 802.11B wireless network. In still another embodiment, the network 105 may be any suitable network or combination of networks. Although one network 105 is shown, in other embodiments any number of networks (of the same or different types) may be present.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the electronic device 102, and that, when read and executed by one or more processors in the electronic device 102, cause the electronic device to perform the steps necessary to execute steps or elements embodying the various aspects of an embodiment of the invention.

Moreover, while embodiments of the invention have and hereinafter will be described in the context of fully functioning electronic devices, the various embodiments of the invention are capable of being distributed as a program product in a variety of forms, and the invention applies equally regardless of the particular type of signal-bearing medium used to actually carry out the distribution. The programs defining the functions of this embodiment may be delivered to the electronic device 102 via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, e.g., the network 105, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
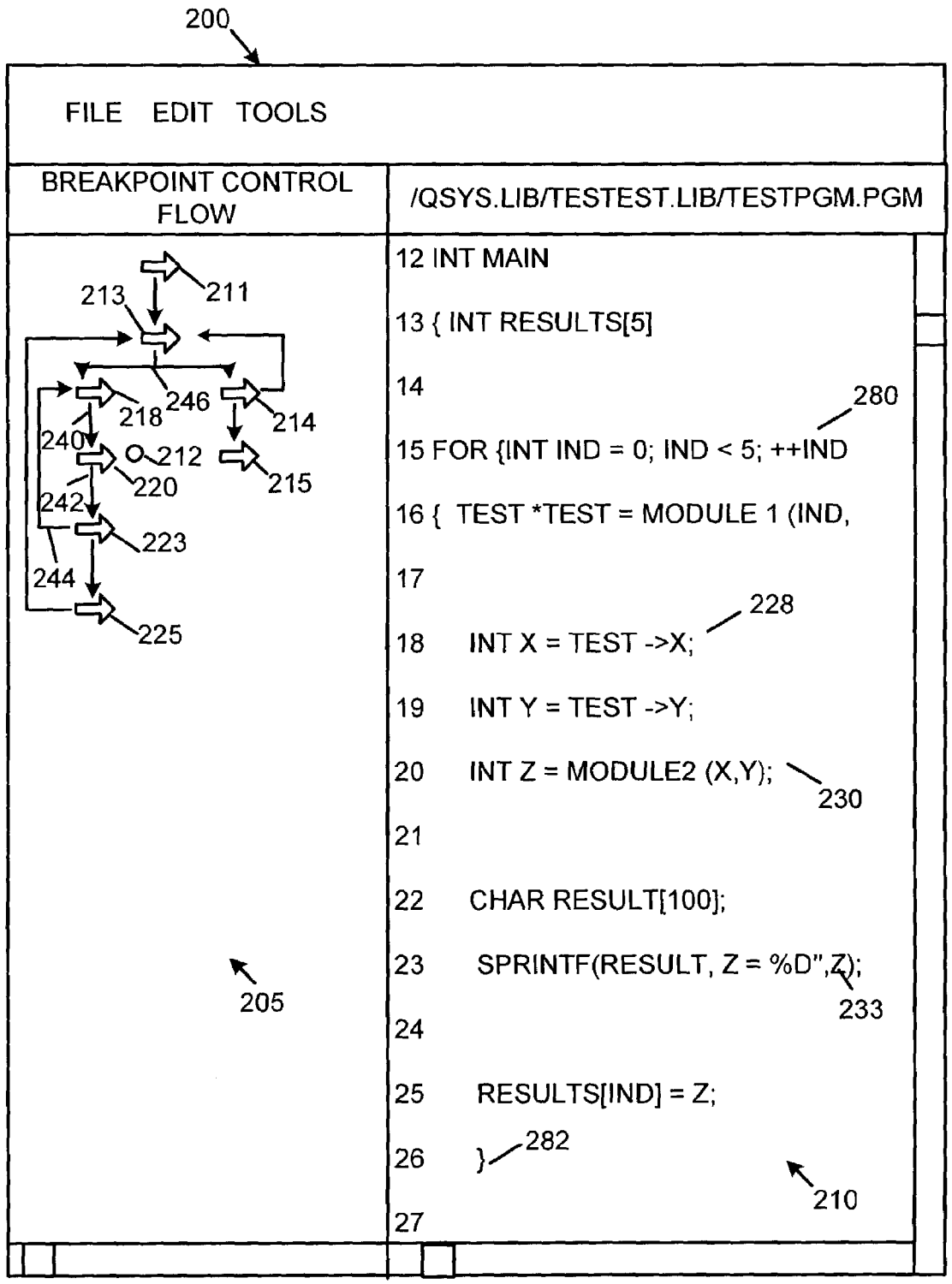
FIG. 2 depicts a pictorial representation of an example user interface for requesting the manipulation of breakpoints, according to an embodiment of the invention.

FIG. 2 depicts a pictorial representation of an example user interface 200 for requesting the manipulation of breakpoints based on control flow, according to an embodiment of the invention. Displayed within the user interface 200 are a breakpoint control flow panel 205 and a program listing panel 210.

The breakpoint control flow panel 205 includes a control flow of breakpoints. Illustrated in the breakpoint control flow panel 205 are a number of breakpoints, such as breakpoints 211, 213, 214, 215, 218, 220, 223, and 225. Although an icon of a stylized arrow is illustrated as representing the breakpoints, in other embodiments any appropriate icon or other indication may be used. The breakpoint control flow panel 205 also includes a number of arcs, such as arc 240, 242, 244, and 246 which indicate flow of control of the program 127 with respect to the breakpoints.

The program listing panel 210 includes a list of statements in the program 127 to be debugged using the breakpoints shown in the breakpoint control flow panel 205. Shown in the program listing panel 210 are statements 228, 230, 233, 280, and 282.

The breakpoint 218 is set at the statement 228 of the program 127, the breakpoint 220 is set at the statement 230 of the program 127, and the breakpoint 223 is set at the statement 233 of the program 127. The program 127 is currently stopped at the breakpoint 220 at the statement 230, as indicated by the icon 212. Although a circle is illustrated for the icon 212, in other embodiments any appropriate icon, symbol, other indication may be used to indicate a stopped-breakpoint.

Control flow is illustrated in the panel 205 with the program 127 flowing forward from the breakpoint 218 at the statement 228 to the breakpoint 220 at the statement 230, as indicated by the forward arc 240, and control within the program 127 flowing forward from the breakpoint 220 at the statement 230 to the breakpoint 223 at the statement 233, as indicated by the forward arc 242. Control may also flow backward, e.g., from the breakpoint 223 at the statement 233 to the breakpoint 218 at the statement 228, as indicated by the backward arc 244. Control can flow backward because the example program 127 includes a for loop beginning at the statement 280 and terminating at the statement 282, which can cause the statements between 280 and 282 to be executed more than once. Control may also conditionally flow between the breakpoints, as illustrated by the arc 246, which in an embodiment may represent an if-then-else conditional statement with the breakpoints 218, 220, 223, and 225 being on the "then" leg of the conditional statement represented by the arc 246 and the breakpoints 214 and 215 being on the "else" leg of the conditional statement represented by the arc 246.

When a user selects a backward arc in the breakpoint control flow 205, such as the backward arc 244, the debug controller 126 adds all of the breakpoints within the backward arc, such as the breakpoints 218, 220, and 223 to a breakpoint group. In this way, the debug controller 126 adds breakpoints to a group based on a selection of a flow control construct of the program 127.

Although a for loop is shown as a flow control construct, in other embodiments a do-until loop, a while loop, or any other kind of loop may be used as a flow control construct on which to base the adding of breakpoints to a group. In another embodiments a goto statement may be used as a flow control construct. In another embodiment, any kind of conditional statement, such as a if-then-else statement may be used as a flow control construct. In other embodiments, any appropriate type of flow control construct may be used.

The user may request via the user interface 200 that the debug controller 126 add a breakpoint in the program 127, remove a breakpoint from the program 127, and add a breakpoint to a group based on control flow as further described below with reference to FIG. 4. The debug controller 126 may also support a variety of other breakpoint and breakpoint group operations not necessary to an understand of embodiments of the invention.

The user interface 200 is exemplary only, and in other embodiments any appropriate user interface may be used to invoke the functions of FIGS. 4–11. The breakpoints and arcs illustrated in the hierarchy panel 205 and the statements illustrated in the program listing panel 210 for the program 127 are exemplary only, and in other embodiments any appropriate breakpoints, forward and backward arcs, and statements may be used.

Figure 3A:
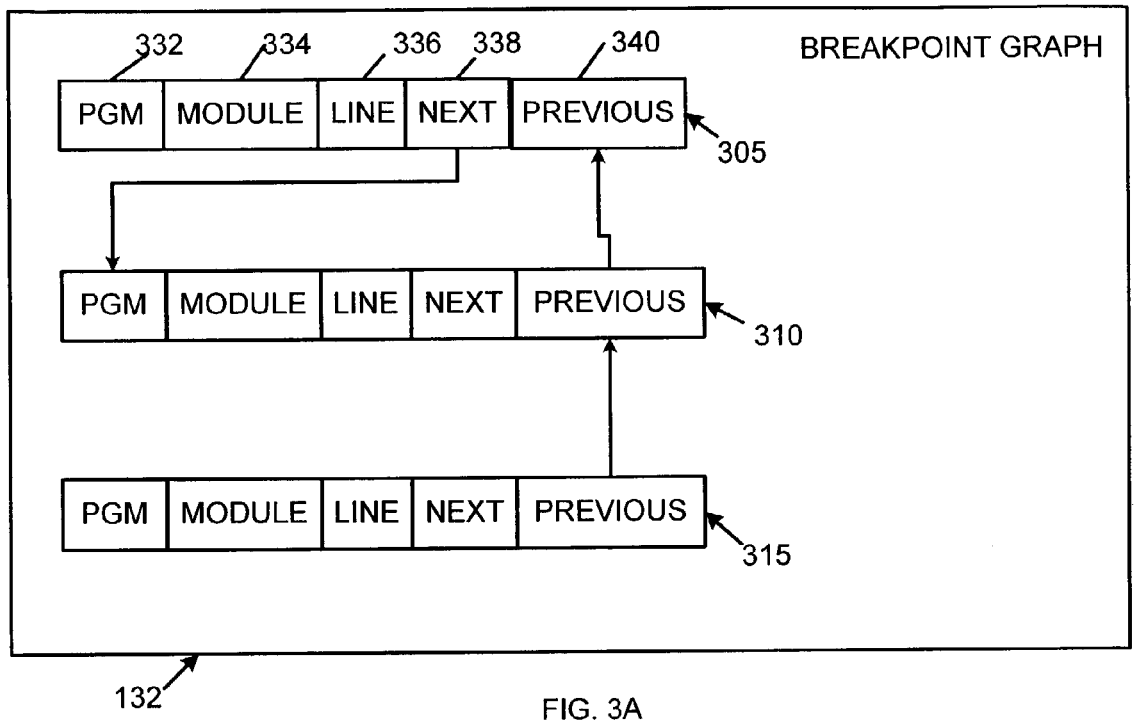
FIG. 3A depicts a block diagram of an example data structure that represents a breakpoint graph, according to an embodiment of the invention.

FIG. 3A depicts a block diagram of an example data structure for the breakpoint graph 132, according to an embodiment of the invention. The breakpoint graph 132 includes a node (record or entry) for each breakpoint shown in the breakpoint control flow 205, such as example nodes 305, 310, and 315

Each breakpoint node, such as the breakpoint node 305, includes a program field 332, a module field 334, a line field 336, a set of next arcs field 338, and a set of previous arcs field 340, although in other embodiments more or fewer fields may be present.

The program field 332, the module field 334, and the line field 336 indicate the program, module, and line, respectively, within the program 127 where the breakpoint is set. In another embodiment, the module field 334 is optional or not used. The line field 336 indicates the statement number, instruction number, offset, or other information identifying the location in the program 127 where the associated breakpoint is set. In the example of FIG. 2, the line field 336 may include "18" in the breakpoint node associated with the breakpoint 218 at the statement 228, "20" in the breakpoint node associated with the breakpoint 220 at the statement 230, and "23" in the breakpoint node associated with the breakpoint 223 at the statement 233.

The set of next arcs field 338 points to the next node or nodes in the breakpoint graph 132 to which an arc or arcs point. For example, the node associated with the breakpoint 213 has a next arcs field 338 that points to nodes associated with the breakpoints 218 and 214. In an embodiment the set of next arcs field 338 includes a null value when no such next node exists. In other embodiments any other appropriate mechanism may be used to indicate that no next node exists.

The set of previous arcs field 340 points to the previous node or nodes in the breakpoint graph 132 to which an arc or arcs point. For example, the node associated with the breakpoint 223 has a previous arcs field 340 that points to the node associated with the breakpoint 220. In an embodiment the previous arcs field 340 includes a null value when no such previous node exists. In other embodiments any other appropriate mechanism may be used to indicate that no previous node exists.

Although the embodiment shown in FIG. 3A shows three nodes 305, 310, and 315, in the breakpoint graph 132, in another embodiment any number of nodes may be present corresponding to the number of breakpoints.

Figure 3B:
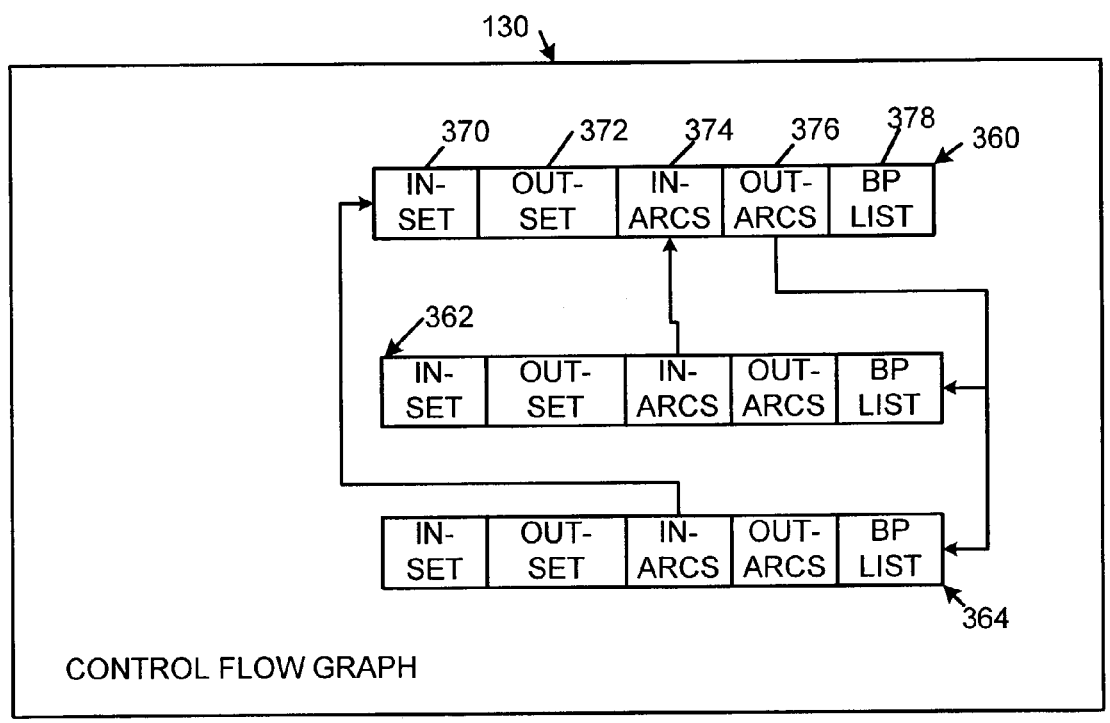
FIG. 3B depicts a block diagram of an example data structure that represents a control flow graph, according to an embodiment of the invention.

FIG. 3B depicts a block diagram of a data structure for the control flow graph 130, according to an embodiment of the invention.

The control flow graph 130 includes a node (record or entry), such as example nodes 360, 362, and 364, for each basic block in the program 127. A basic block is a straight sequence of program statements with no branches into the basic block except at the beginning and no branches out of the basic block except at the end. Each node, such as the node 360, includes an in-set field 370, an out-set field 372, an in-arcs field 374, an out-arcs field 376, and a breakpoint list field 378, although in other embodiments more or fewer fields may be present.

The in-set field 370 includes a set of breakpoints that can flow into the first breakpoint in the breakpoint list 378. Flowing into the first breakpoint means that if a resume operation occurs from a breakpoint in the in-set field 370, the first breakpoint in the breakpoint list 378 can be hit without hitting another breakpoint. The in-set field 370 is filled in by the debug controller 126.

The out-set field 372 includes a set of breakpoints that can flow out of the current node in the control flow graph 130. The out-set field 372 is filled in by the debug controller 126.

The in-arcs field 374 includes a set of pointers to the control flow nodes that have arcs that point into (flow into) nodes in the control flow graph 130. The out-arcs field 376 includes a set of pointers representing the arcs that point out of (or originate from) the basic block associated with the node in the control flow graph 130.

The breakpoint list 378 includes a breakpoint or breakpoints that are set in the basic block represented by the node.

Although the embodiment shown in FIG. 3B shows three nodes 360, 362, and 364, in the control flow graph 130, in another embodiment any number of nodes may be present corresponding to the number of basic blocks in the program 127.

Figure 4:
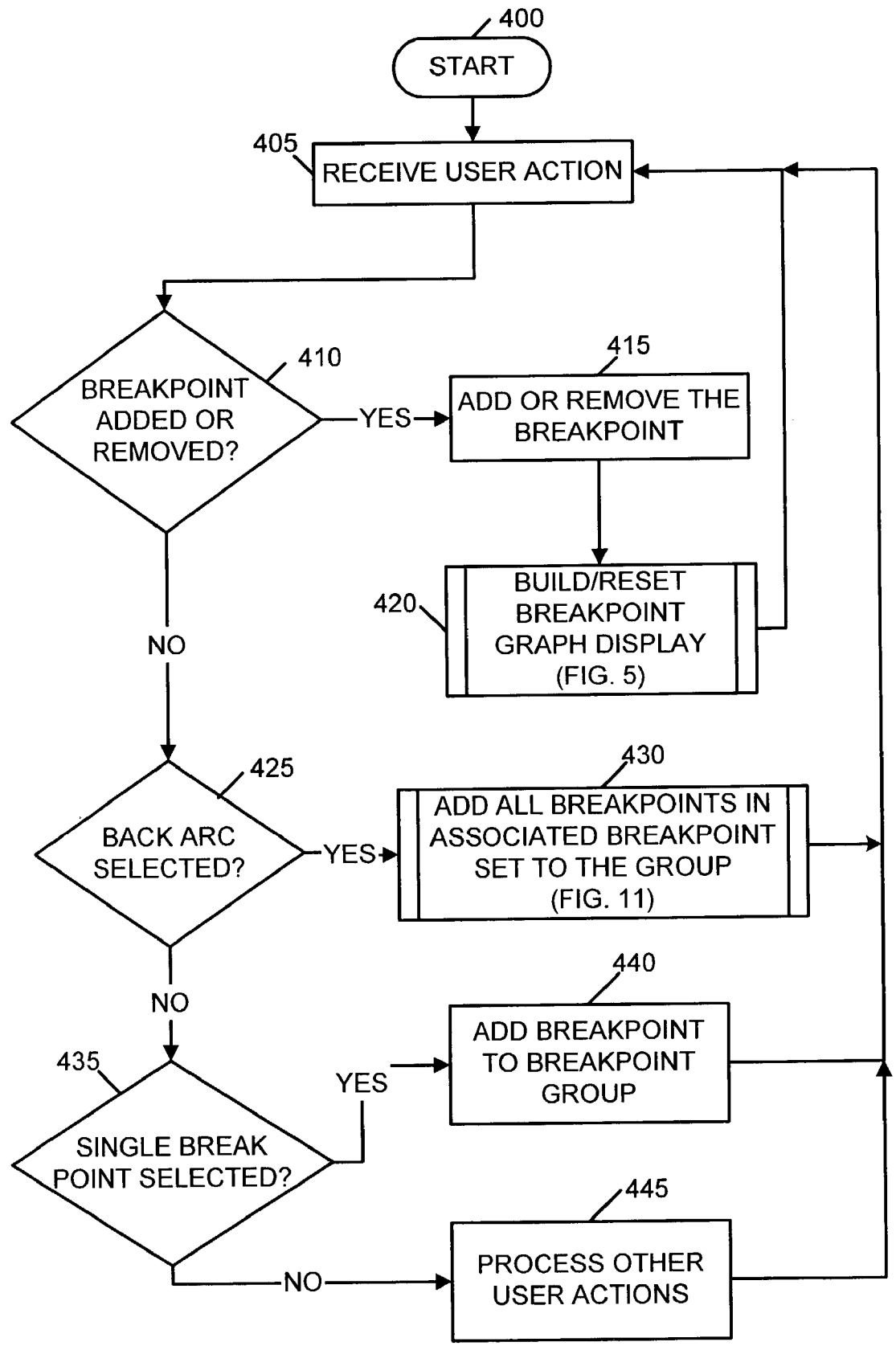
FIG. 4 depicts a flowchart of example processing to manipulate breakpoints, according to an embodiment of the invention.

FIG. 4 depicts a flowchart of example processing to manipulate breakpoints, according to an embodiment of the invention. Control begins at block 400. Control then continues to block 405 where the debug controller 126 receives an event from the user interface 200. Control then continues to block 410 where the debug controller 126 determines whether the event is a breakpoint added or removed event.

If the determination at block 410 is true, then control continues to block 415 where the debug controller 126 adds or removes the breakpoint in the program 127. Control then continues to block 420 where the debug controller 126 builds or resets the breakpoint graph 132 and the breakpoint control flow 205, as further described below with reference to FIG. 5. Control then returns to block 405, as previously described above.

If the determination at block 410 is false, then control continues to block 425 where the debug controller 126 determines whether the event received is a back arc selected event. A back arc, such as the back arc 244, may be selected in the breakpoint control flow 205 via the input device 120. If the determination at block 425 is true, then control continues to block 430 where the debug controller 126 adds all breakpoints in a breakpoint set associated with the back arc to a breakpoint group, as further described below with reference to FIG. 11. Control then returns to block 405, as previously described above.

If the determination at block 425 is false, then control continues to block 435 where the debug controller 126 determines whether the event received represents that the user selected a single breakpoint in the breakpoint control flow 205. If the determination at block 435 is true, then control continues to block 440 where the debug controller 126 adds the selected breakpoint to a breakpoint group. Control then returns to block 405, as previously described above.

If the determination at block 435 is false, then control continues to block 445 where the debug controller 126 processes other user actions. One such other action is to select a breakpoint group to which breakpoints are to be added. Control then returns to block 405, as previously described above.

Figure 5:
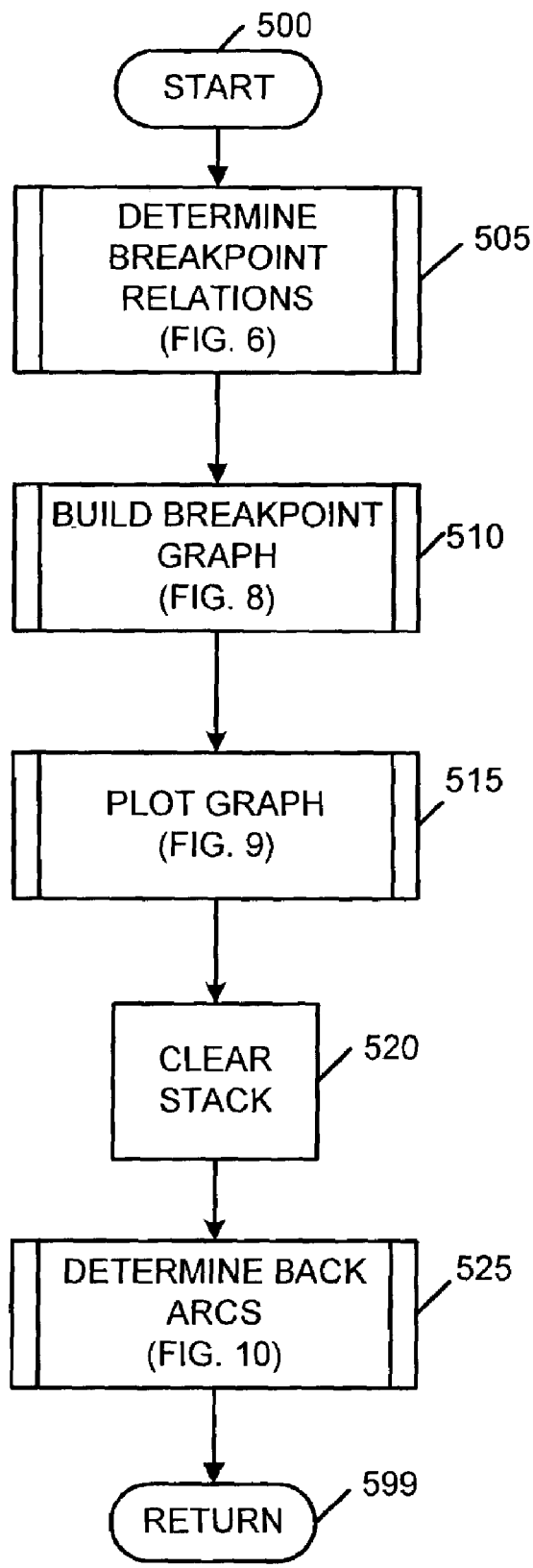
FIG. 5 depicts a flowchart of example processing for building and resetting a breakpoint graphical display, according to an embodiment of the invention.

FIG. 5 depicts a flowchart of example processing for building and resetting the breakpoint control flow 205, according to an embodiment of the invention. Control begins at block 500. Control then continues to block 505 where the debug controller 126 determines breakpoint relations, as further described below with reference to FIG. 6. Control then continues to block 510 where the debug controller 126 builds the breakpoint graph 132, as further described below with reference to FIG. 8.

Control then continues to block 515 where the debug controller 126 plots or draws the breakpoint graph 132 on the output device 120 as the breakpoint control flow 205, as further described below with reference to FIG. 9. Control then continues to block 520 where the debug controller 126 clears a stack that is used to determine back arcs. Control then continues to block 525 where the debug controller 126 determines back arcs, as further described below with reference to FIG. 10. Control then continues to block 599 where the function returns.

Figure 6:
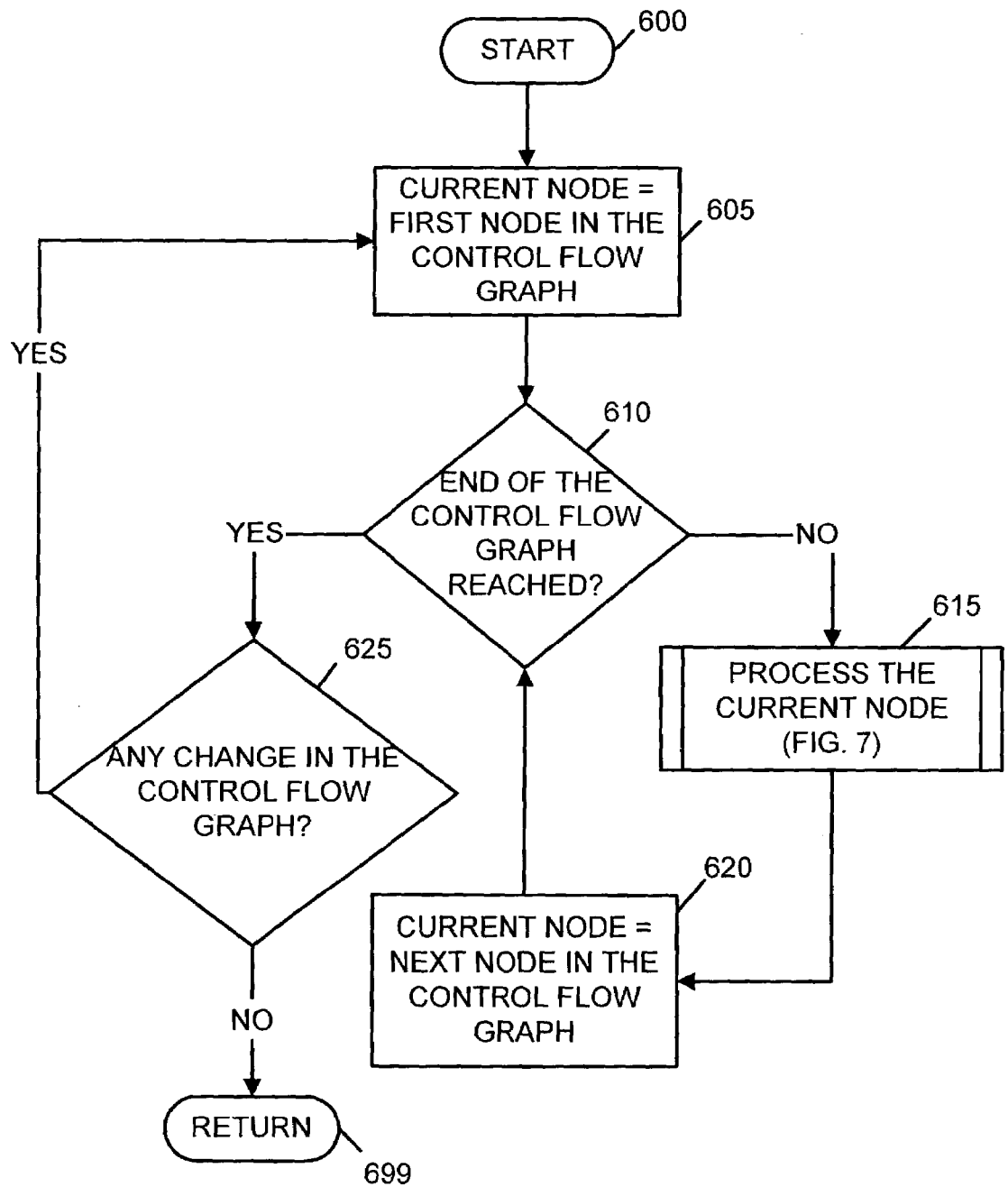
FIG. 6 depicts a flowchart of example processing for determining breakpoint relations, according to an embodiment of the invention.

FIG. 6 depicts a flowchart of example processing for determining breakpoint relations, according to an embodiment of the invention. Control begins at block 600. Control then continues to block 605 where the debug controller 126 sets the current node to be the first node in the control flow graph 130. Although the logic of FIG. 6 illustrates the nodes in the control flow graph 130 being visited in a breadth-first top-down order, in another embodiment the nodes may be visited in any appropriate order. Control then continues to block 610 where the debug controller 126 determines whether the end of the control flow graph 130 has been reached. If the determination at block 610 is false, then control continues to block 615 where the debug controller 126 processes the current node, as further described below with reference to FIG. 7. Control then continues to block 620 where the debug controller 126 sets the current node to be the next node in the control flow graph 130. Control then returns to block 610, as previously described above.

If the determination at block 610 is true, then all nodes in the control flow graph 130 have been processed, so control continues to block 625 where the debug controller 126 determines whether the processing of block 615 has caused any change in any in-set 370 or any out-set 372 of the control flow graph 130. If the determination at block 625 is true, then control returns to block 605, where all nodes in the control flow graph are once again started to be processed, as previously described above.

If the determination at block 625 is false, then control continues to block 699 where the function returns.

Figure 7:
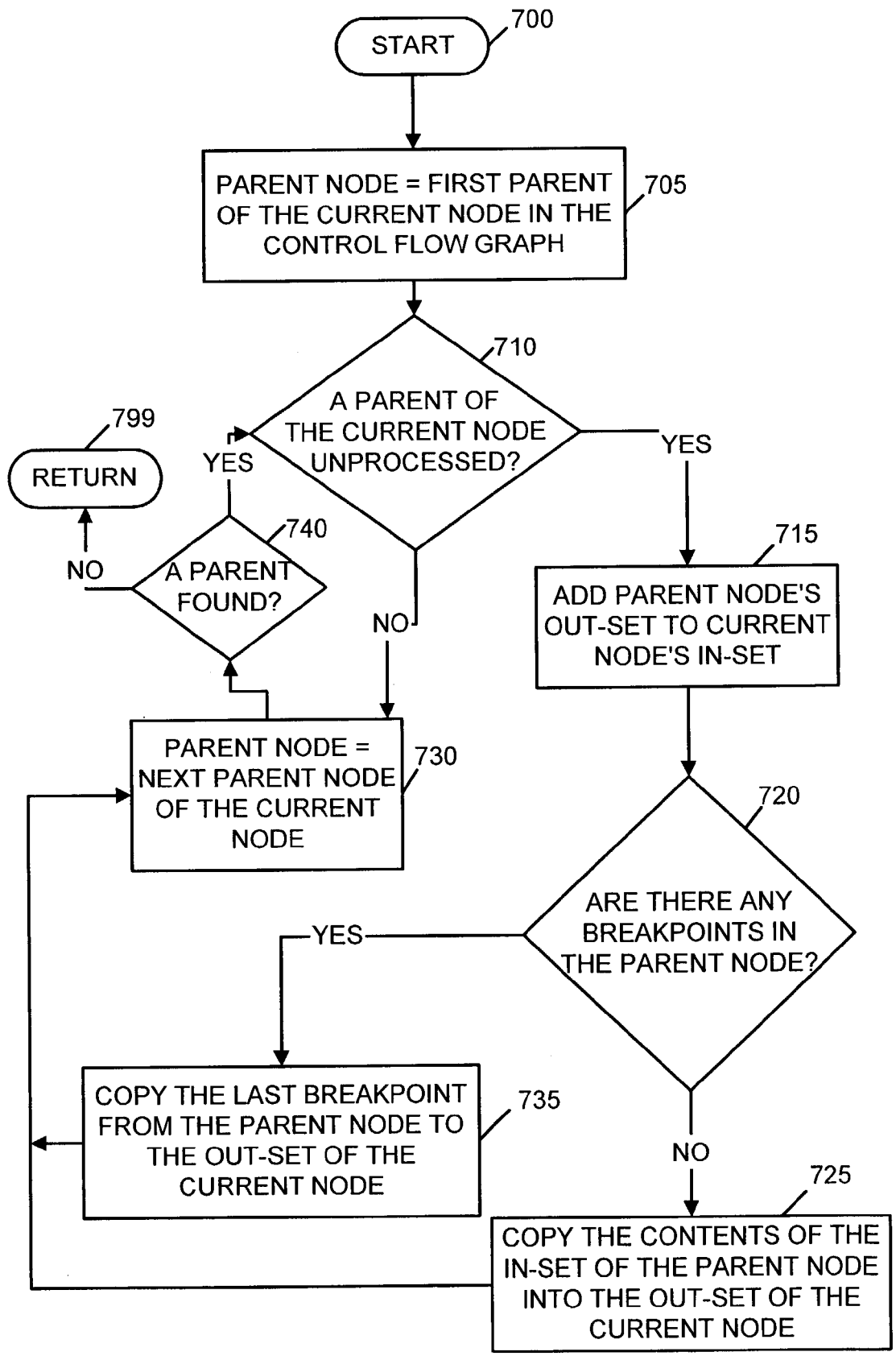
FIG. 7 depicts a flowchart of example processing for processing a control flow graph node, according to an embodiment of the invention.

FIG. 7 depicts a flowchart of example processing for processing a control flow graph node, according to an embodiment of the invention. Control begins at block 700. Control then continues to block 705 where the debug controller 126 sets the parent node to be the first parent of the current node in the control flow graph 130. The parents are found via the in-arcs field 374.

Control then continues to block 710 where the debug controller 126 determines whether a parent of the current node is unprocessed. If the determination at block 710 is true, then control continues to block 715 where the debug controller 126 adds the parent node's out-set 372 to the current node's in-set 370. Control then continues to block 720 where the debug controller 126 determines whether there are any breakpoints in the breakpoint list 378 in the parent node.

If the determination at block 720 is false, then control continues to block 725 where the debug controller 126 copies the contents of the in-set 370 of the parent node into the out-set 372 of the current node. Control then continues to block 730 where the debug controller 126 sets the parent node to be the next parent node of the current node. The parents are found via the in-arcs field 374. Control then continues to block 740 where the debug controller 126 determines whether a parent was found at block 730. If the determination at block 740 is false, then control continues to block 799 where the function returns. If the determination at block 740 is true, then control returns to block 710, as previously described above.

If the determination at block 720 is true, then control continues to block 735 where the debug controller 126 copies the last breakpoint from the breakpoint list 378 in the parent node to the out-set 372 of the current node. Control then continues to block 730, as previously described above.

If the determination at block 710 is false, then control continues to block 730, as previously described above.

Figure 8:
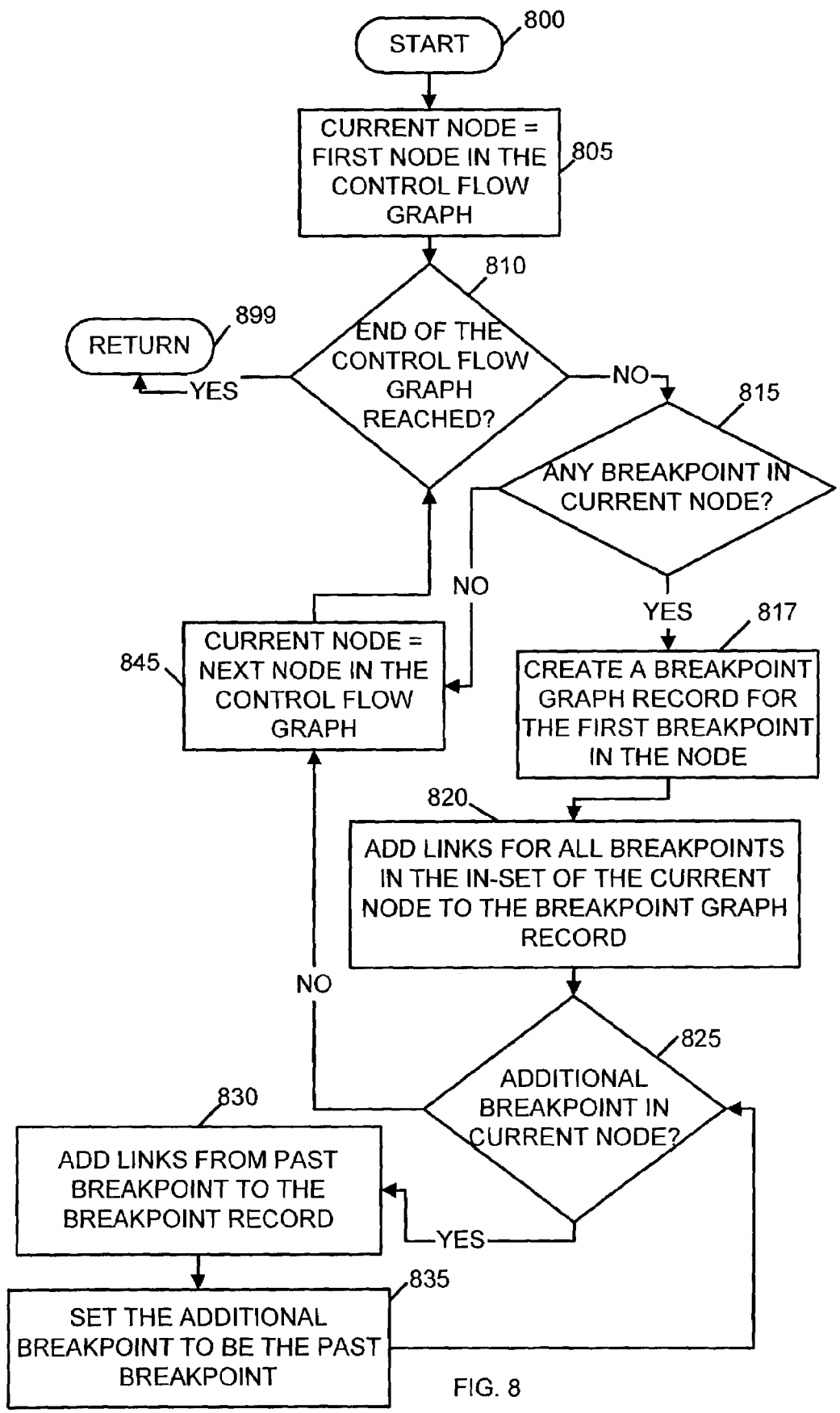
FIG. 8 depicts a flowchart of example processing for building a breakpoint graph, according to an embodiment of the invention.

FIG. 8 depicts a flowchart of example processing for building the breakpoint graph 132, according to an embodiment of the invention. Control begins at block 800. Control then continues to block 805 where the debug controller 126 sets the current node to be the first node in the control flow graph 130. Control then continues to block 810 where the debug controller 126 determines whether the end of the control flow graph 130 is reached. If the determination at block 810 is false, then control continues to block 815 where the debug controller 126 determines whether there are any breakpoints in the breakpoint list 378 in the current node.

If the determination at block 815 is false, then control continues to block 845 where the debug controller 126 sets the current node to be the next node in the control flow graph 130. Control then returns to block 810, as previously described above.

If the determination at block 815 is true, then control continues to block 817 where the debug controller 126 creates a record in the breakpoint graph 132 for the first breakpoint in the node's breakpoint list 378. Control then continues to block 820 where the debug controller 126 adds links to and from the associated breakpoint graph records for all breakpoints in the in-set 370 of the current node. This is accomplished by adding an additional link to the next fields 338 of all the breakpoint records referred to by the in-set 370 of the current node in the control flow graph 130. Further additional links are added to the previous field 340 of the breakpoint record associated with the first breakpoint in the breakpoint list 378. These links refer to each of the breakpoints in the in-set 370 of the current node of the control flow graph 130. The debug controller 126 further sets the breakpoint record previously created at block 817 to be the past breakpoint.

Control then continues to block 825 where the debug controller 126 determines whether the current node has an additional breakpoint in the breakpoint list 378. If the determination at block 825 is true, then control continues to block 830 where the debug controller 126 adds a link from the past breakpoint to the breakpoint record associated with the additional breakpoint and creates the breakpoint record if it does not already exist. Control then continues to block 835 where the debug controller 126 sets the breakpoint record associated with the additional breakpoint to be the past breakpoint. Control then returns to block 825, as previously described above.

If the determination at block 825 is false, then control continues to block 845, as previously described above.

If the determination at block 810 is true, then control continues to block 899 where the function returns.

Figure 9:
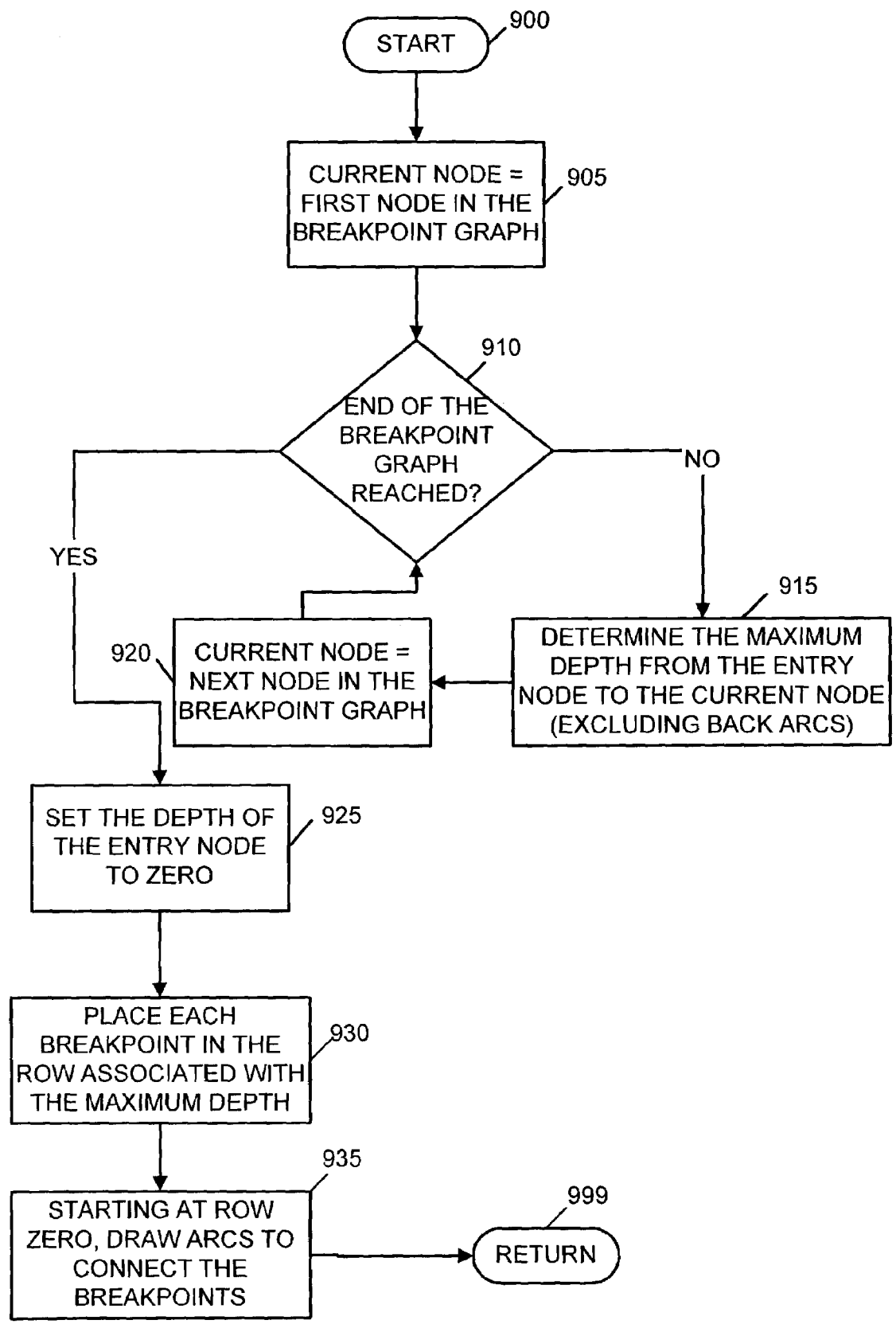
FIG. 9 depicts a flowchart of example processing for plotting a breakpoint graph, according to an embodiment of the invention.

FIG. 9 depicts a flowchart of example processing for plotting the breakpoint control flow 205, according to an embodiment of the invention. Control begins at block 900. Control then continues to block 905 where the debug controller 126 sets the current node to be the first node in the breakpoint graph 132. Control then continues to block 910 where the debug controller 126 determines whether the end of the breakpoint graph 132 is reached. If the determination at block 910 is false, then control continues to block 915 where the debug controller 126 determines the maximum depth from the entry node to the current node, excluding back arcs. In the example of FIG. 2, the node associated with the breakpoint 211 is the entry node because the breakpoint 211 is the first, top-most node in the breakpoint control flow 205. Control then continues to block 920 where the debug controller 126 sets the current node to be next node in the breakpoint graph 132. Control then returns to block 910, as previously described above.

If the determination at block 910 is true, then control continues to block 925 where the debug controller 126 sets the depth of the entry node to zero. Control then continues to block 930 where the debug controller 126 places each breakpoint in the row in the breakpoint control flow panel 205 associated with that breakpoint's maximum depth. Control then continues to block 935 where the debug controller 126 draws the arcs to connect the breakpoints, starting at row zero (the entry node) using the data in the next field 338 and the previous field 340 for each breakpoint. Control then continues to block 999 where the function returns.

Figure 10:
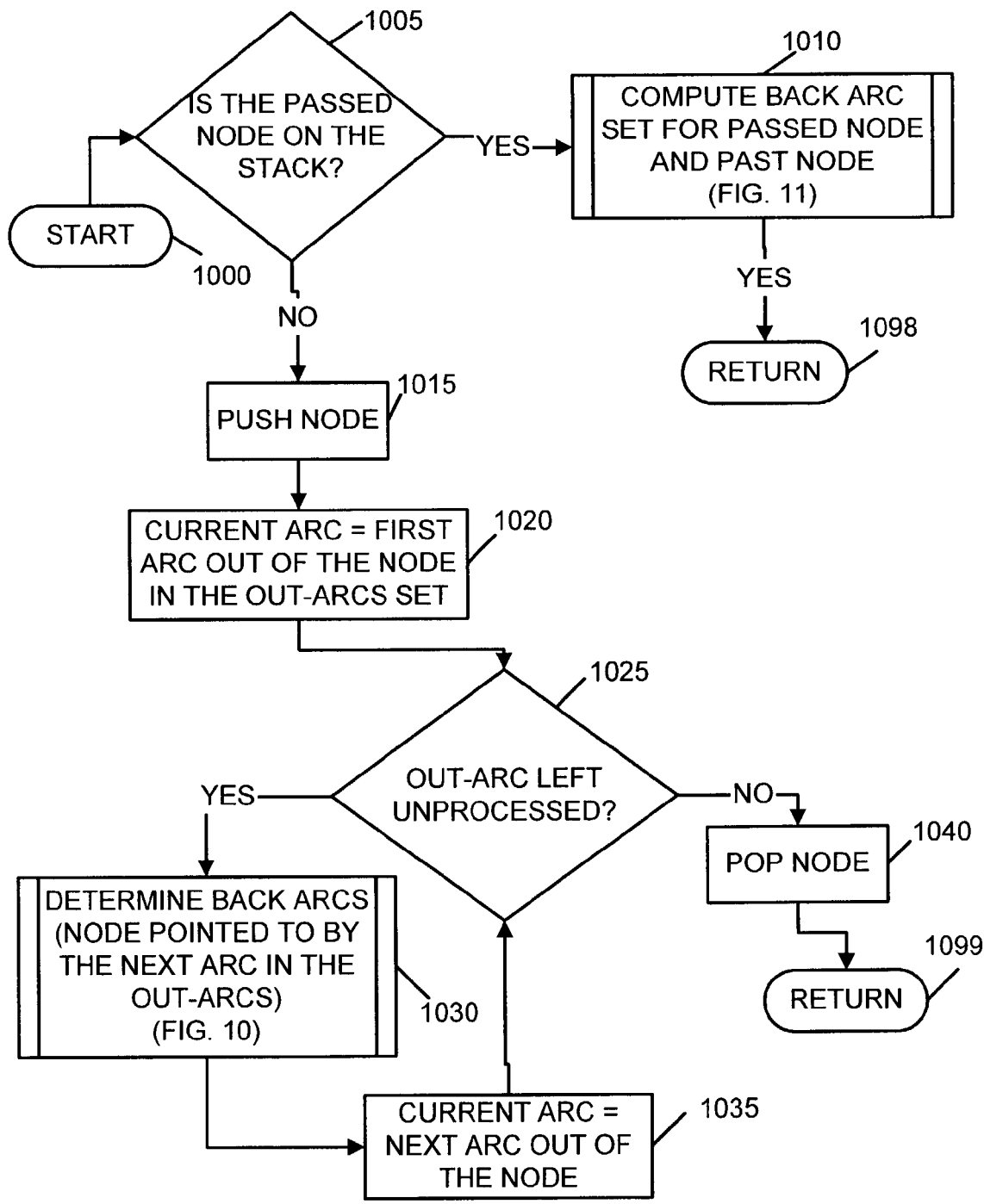
FIG. 10 depicts a flowchart of example processing for determining back arcs, according to an embodiment of the invention.

FIG. 10 depicts a flowchart of example processing for determining back arcs, according to an embodiment of the invention. Control begins at block 1000. Control then continues to block 1005 where the debug controller 126 determines whether the passed node is on the stack. If the determination at block 1005 is false, then control continues to block 1015 where the debug controller 126 pushes the passed node onto the stack. Control then continues to block 1020 where the debug controller 126 sets the current arc to be the first arc in the out-arcs set 372 in the passed node. Control then continues to block 1025 where the debug controller 126 determines whether there are any arcs left unprocessed in the out-arcs set 372 in the passed node. If the determination at block 1025 is true, then control continues to block 1030 where the debug controller 126 recursively calls the logic of FIG. 10 and passes the node pointed to by the next unprocessed arc in the out-arcs set 372. Control then continues to block 1035 where the debug controller 126 sets the current arc to be the next arc in the out-arcs set 372. Control then returns to block 1025, as previously described above.

If the determination at block 1025 is false, then control continues to block 1040 where the debug controller 1040 pops the node off the top of the stack. Control then continues to block 1099 where the function returns.

If the determination at block 1005 is true, then control continues to block 1010 where the debug controller 126 computes the back arc set for the passed node and the past node, as further described below with reference to FIG. 11. Control then continues to block 1098 where the function returns.

Figure 11:
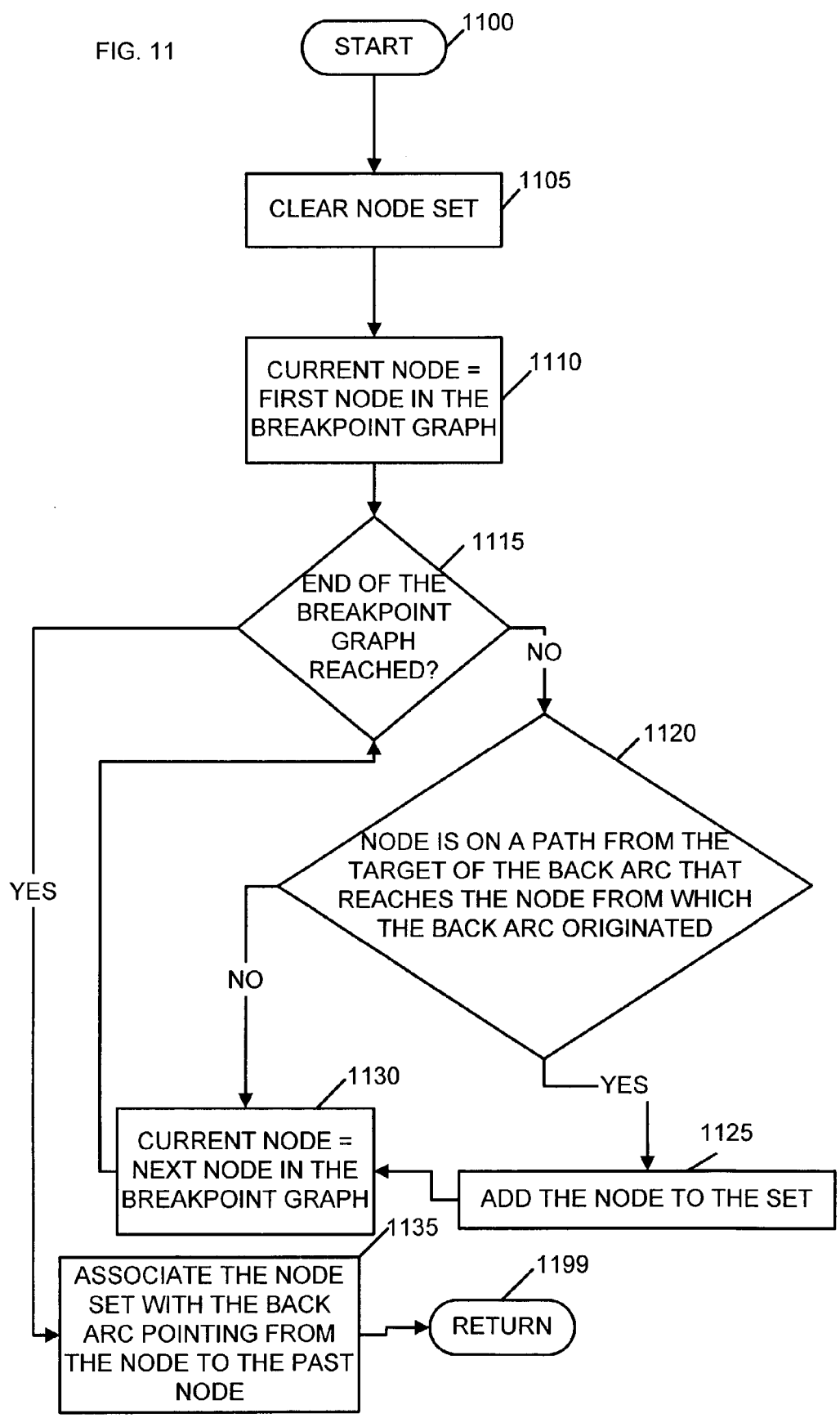
FIG. 11 depicts a flowchart of example processing for computing a breakpoint graph node set associated with a back arc, according to an embodiment of the invention.

FIG. 11 depicts a flowchart of example processing for computing a breakpoint graph node set associated with a back arc, according to an embodiment of the invention. The logic of FIG. 11 is passed two parameters: a node and a past node. The logic of FIG. 11 associates a set of nodes with the back arc that flows from the node to the past node, so that when the user selects this back arc, the debug controller 126 can add the breakpoints of the associated set of nodes to the group, as previously described above with reference to FIG. 4.

Control begins at block 1100. Control then continues to block 1105 where the debug controller 126 clears a node set that will be used, as further described below, to store breakpoints associated with a back arc. Control then continues to block 1110 where the breakpoint controller 126 sets the current node to be the first node in the breakpoint graph 132. Control then continues to block 1115 where the debug controller 126 determines whether the end of the breakpoint graph 132 is reached.

If the determination at block 1115 is false, then control continues to block 1120 where the debug controller 126 determines whether the current node is on a path from the target of the back arc that reaches the node from which the back arc originated. If the determination at block 1120 is true, then control continues to block 1125 where the debug controller 126 adds the current node to the node set. Control then continues to block 1130 where the debug controller 126 sets the current node to be the next node in the breakpoint graph 132. Control then returns to block 1115, as previously described above.

If the determination at block 1120 is false, then control continues directly to block 1130, as previously described above.

If the determination at block 1115 is true, then control continues to block 1135 where the debug controller 126 associates the node set with the back arc that points from the passed node to the past node. Control then continues to block 1100 where the function returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
    displaying a plurality of icons representing a plurality of breakpoints in a program;
    displaying a plurality of arcs connecting a the icons, wherein the plurality of arcs represent a control flow of the program between the plurality of breakpoints, wherein the control flow further comprises a forward control flow of the program, a backward control flow of the program, and a conditional control flow of the program;
    in response to a selection of one of the plurality of arcs, finding a subset of the plurality of breakpoints associated with the one of the plurality of arcs; and
    adding the subset to a breakpoint group, wherein all of the breakpoints in the breakpoint group are enabled and disabled at once.

2. An apparatus comprising:
    means for displaying a plurality of icons representing a plurality of breakpoints;
    means for displaying a plurality of arcs connecting the icons, wherein the plurality of arcs represent a control flow of a program between the plurality of breakpoints, wherein the control flow further comprises a forward control flow of the program, a backward control flow of the program, and a conditional control flow of the program; and
    means for finding a subset of the plurality of breakpoints associated with one of the plurality of arcs in response to a selection of the one of the plurality of arcs.

3. The apparatus of claim 2, further comprising:
    means for adding the subset of the plurality of breakpoints to a breakpoint group, and wherein all of the breakpoints in the breakpoint group are enabled and disabled at once.

4. The apparatus of claim 3, wherein the means for adding is in response to the selection of the one of the plurality of arcs.

5. A storage medium encoded with instructions, wherein the instructions when executed comprise:
    displaying a plurality of icons representing a plurality of breakpoints;
    displaying a plurality of arcs connecting the plurality of icons, wherein the plurality of arcs represent a control flow of a program between the plurality of breakpoints, wherein the control flow further comprises a forward control flow of the program, a backward control flow of the program, and a conditional control flow of the program; and
    in response to a selection of one of the plurality of arcs, finding a subset of the plurality of breakpoints associated with the one of the plurality of arcs.

6. The storage medium of claim 5, further comprising:
    adding the subset to a breakpoint group, herein all of the breakpoints in the breakpoint group are enabled and disabled at once.

7. The storage medium of claim 5, wherein the one of the plurality of arcs represents a loop construct in the program.

8. The storage medium of claim 5, wherein the one of the plurality of arcs comprises a back arc.

9. A storage medium encoded with a data structure accessed by a controller, wherein the data structure comprises a plurality of nodes representing a plurality of breakpoints and a plurality of arcs between the plurality of breakpoints, wherein a first node in the plurality of nodes represents a first breakpoint in the plurality of breakpoints, wherein the first node comprises:
    an in-set field, wherein the controller creates in the in-set field a first set of pointers to a first subset of the plurality of nodes that represents a first subset of the plurality of breakpoints in a program tat can flow into the first breakpoint, wherein the flow further comprises a forward control flow of the program, a backward control flow of the program, and a conditional control flow of the program.

10. The storage medium of claim 9, further comprising:
    an out-set field, wherein the controller creates in the out-set field a second set of pointers to a second subset of the plurality of nodes that represents a second subset of the plurality of breakpoints that can flow out of the first breakpoint.

11. The storage medium of claim 9, further comprising:
    an in-arcs field, wherein the controller creates in the in-arc field a second set of pointers to a second subset of the plurality of nodes, wherein an arc in the plurality of arcs exists from each node in the second subset of nodes to the first node.

12. The storage medium of claim 9, further comprising:
    an out-arcs field, wherein the controller creates in the out-arc field a second set of pointers to a second subset of the plurality of nodes, wherein an arc in the plurality of arcs exists from the first node to each of the second subset of nodes.

13. An electronic device comprising:
    a processor; and
    a storage device encoded with instructions, wherein the instructions when executed on the processor comprise:
        displaying a plurality of icons representing a plurality of breakpoints in a program,
        displaying a plurality of arcs connecting the icons, wherein the plurality of arcs represent a control flow of the program between the plurality of breakpoints, wherein the control flow further comprises a forward control flow of the program, a backward control flow of the program, and a conditional control flow of the program,
        in response to a selection of one of the plurality of arcs, finding a subset of the plurality of breakpoints associated with the one of the plurality of arcs, and
        adding the subset to a breakpoint group, wherein all of the breakpoints in the breakpoint group are enabled and disabled at once.

14. The electronic device of claim 13, wherein the one of the plurality of arcs comprises a back arc.

15. The electronic device of claim 13, wherein the one of the plurality of arcs represents a loop construct.

16. The electronic device of claim 13, wherein the instructions further comprise:

indicating that one of the plurality of icons represents a stopped-breakpoint in the plurality of breakpoints, wherein the program is stopped at the stopped-breakpoint.

* * * * *